United States Patent Office 3,487,022
Patented Dec. 30, 1969

3,487,022
LIQUID LOW-MELTING EUTECTIC HYDROXYL-AMMONIUM ACID SULFATE COMPOSITION
Wallace F. Runge, Terre Haute, Ind., assignor to Commercial Solvents Corporation, New York, N.Y., a corporation of Maryland
No Drawing. Filed Oct. 31, 1966, Ser. No. 590,530
Int. Cl. C09k 3/02
U.S. Cl. 252—188  10 Claims

ABSTRACT OF THE DISCLOSURE

Liquid compositions having from 75% to 85% by weight of hydroxylammonium acid sulfate, sulfuric acid and water, and having crystallization temperatures below 25° C., being especially suitable for shipping in bulk.

---

This invention relates to hydroxylammonium acid sulfate compositions. In a particular aspect it relates to liquid hydroxylammonium acid sulfate compositions suitable for transportation in bulk containers.

Hydroxylammonium acid sulfate, hereinafter referred to as HAS, is useful as a reducing agent and a reagent for synthesis, e.g., for synthesis of oximes. Commercial-grade material is a wet, flaky solid containing from 3 to 8% by weight sulfuric acid, and about 0.1 to 3% water. This product tends to set up to a hard cake during storage and, when caked, it is difficult to break up again. Because of the sulfuric acid content, HAS is corrosive to flesh and ordinary steel and presents several problems in shipping and handling. It has been customary to ship HAS in fiber drums with an acid-resistant liner, but this procedure fails to avoid problems of caking and high shipping costs. To avoid the caking problem it has been packaged in small lots in plastic bags which in turn are packaged in fiber drums. This method overcomes the problem of breaking up badly caked material but results in still higher costs.

It is an object of this invention to provide liquid compositions of HAS.

It is another object of this invention to provide compositions of HAS suitable for transportation in bulk containers.

Other objects of this invention will be apparent to those skilled in the art from the description herein.

It is the discovery of this invention that combinations of HAS, sulfuric acid and water form low-melting eutectic mixtures and provide liquid compositions suitable for transportation in bulk containers, i.e., in tank cars and tank trucks. The compositions of this invention are those having an HAS content of from about 75% to about 85% by weight and a sulfuric acid content within the range of from about 2.1% to about 12.5%. The remainder of these compositions is principally water along with any minor impurities introduced during the process of manufacture of the HAS. At 75% HAS, the sulfuric acid content is within the range of from about 5.7% to about 12.5%, and at 85% HAS, the sulfuric acid content is within the range of from about 2.1% to about 6.2% by weight. These compositions have crystallization temperatures of about 25° C. or below. Crystallization temperature is defined as the temperature at which the first crystals appear, and the solidification temperature is a few degrees lower.

The HAS-sulfuric acid-water compositions having crystallization temperatures below about 25° C. are suitable for shipment as liquids in acid-resistant bulk containers, i.e. tank cars and tank trucks, without appreciable likelihood of solidification during transit. In cold weather the compositions can be shipped in insulated cars and trucks, and advantageously can be heated just prior to loading. If the compositions do solidify, they can be easily melted again by heating. The HAS compositions of this invention can be handled in bulk by following much the same techniques as used for sulfuric acid. These HAS compositions are, however, much less hazardous than sulfuric acid.

The preferred compositions of this invention have crystallization temperatures below about 20° C. and are especially useful in cold weather. At 75% HAS, these compositions have from about 6.8% to about 12.0% by weight sulfuric acid with a corresponding water content of from about 18.2% to about 13.0%, respectively. At 85% HAS, the sulfuric acid content is within a range of from about 2.8% to about 5.5%.

Some specific compositions of this invention employing both commercial-grade and purified HAS are given in Table 1.

TABLE 1.—COMPOSITION OF SOME HAS COMPOSITIONS

| | Crystallization temperature | | | | | | | |
|---|---|---|---|---|---|---|---|---|
| | 20° C. or less | | | | 25° C. or less | | | |
| | $H_2SO_4$, percent wt. | | $H_2O$, percent wt. | | $H_2SO_4$, percent wt. | | $H_2O$, percent wt. | |
| | Min. | Max. | Min. | Max. | Min. | Max. | Min. | Max. |
| Commercial HAS (percent wt.): | | | | | | | | |
| 75.0 | 7.2 | 12.0 | 13.0 | 17.8 | 6.6 | 12.5 | 12.5 | 18.4 |
| 80.0 | 5.5 | 7.5 | 12.5 | 14.5 | 4.5 | 8.1 | 11.9 | 15.5 |
| 82.5 | 5.0 | 6.6 | 10.9 | 12.5 | 4.2 | 7.3 | 10.2 | 13.3 |
| 85.0 | 3.2 | 5.5 | 11.8 | 9.5 | 2.8 | 6.2 | 8.8 | 12.2 |
| Pure HAS (percent wt.): | | | | | | | | |
| 75.0 | 6.8 | 10.9 | 14.1 | 18.2 | 5.7 | 11.7 | 13.3 | 19.3 |
| 80.0 | 4.4 | 6.3 | 13.7 | 15.6 | 3.7 | 7.8 | 12.2 | 16.3 |
| 82.5 | 3.7 | 5.1 | 12.4 | 13.8 | 3.0 | 6.4 | 11.1 | 14.5 |
| 85.0 | 2.8 | 3.4 | 11.6 | 12.2 | 2.1 | 4.4 | 10.6 | 12.9 |

The HAS used in the practice of this invention can be produced by any suitable process, several of which are known; i.e. those of Lippincott, U.S. Patents 2,113,812, -813, -814, or Tryon, U.S. Patent 2,368,072. The sulfuric acid content and water content are then adjusted as necessary to provide the composition of this invention selected for shipment.

In accordance with these processes, HAS is produced by reacting a nitroalkane, e.g., nitromethane, nitroethane, 1-nitropropane, 2-nitropropane, or a mixture thereof, with 95% sulfuric acid, thereby producing a mixture consisting principally of HAS, a residue of the nitroalkane molecule having the same number of carbon atoms as the nitroalkane, and excess sulfuric acid. The nitroalkane residue is removed by distillation, and the resulting commercial-grade HAS-sulfuric acid residue is used in preparing the compositions of this invention. If desired, the HAS can be further purified by any suitable means and this purified HAS is also suitable for the practice of this invention, but for reasons of economy the commercial grade is preferred.

In preparing the compositions of this invention, a predetermined amount of HAS is delivered to a suitable vessel, e.g., a stainless steel tank equipped with a stainless steel agitator. A predetermined amount of water and sulfuric acid sufficient to provide a composition of this invention are then added to the HAS in the vessel and the mixture is thoroughly agitated until a homogeneous solution is obtained. Some heat is generated during the formation of the composition, but if desired, additional heat can be supplied to the mixture to accelerate the formation of the solution. The temperature is then preferably, but not necessarily lowered to about 60° C. The composition is then delivered to a tank car or tank truck for shipment. Optionally, the composition can be stored in an insulated storage vessel until needed for shipment.

If the composition has been allowed to cool, and if outside temperatures below the crystallization temperature of the composition are expected to be encountered during shipment, the temperature of the composition is raised to approximately 50–60° C. before shipment.

The sulfuric acid which can be employed in the practice of this invention is preferably commercial grade having about 95% sulfuric acid content. The water employed in the practice of this invention is preferably of good quality having a minimum of residue. De-ionized water, steam condensate, and distilled water are examples of preferred grades of water.

The following examples are intended to illustrate this invention and are not to be construed as limitations thereof.

EXAMPLE 1

A lot of commercial grade hydroxylammonium acid sulfate had the following analysis:

|  | Percent by weight |
|---|---|
| Hydroxylammonium acid sulfate | 92.2 |
| Free sulfuric acid | 4.5 |
| Water | 2.7 |
| Organic acid (as propionic) | 0.16 |

A series of compositions was prepared from this lot to have a constant HAS concentration of 85% weight, and having a sulfuric acid content of from 0.45% to 11.55% weight. The remainder of the composition was water and whatever minor impurities were present in the HAS.

Because of the initial sulfuric acid content of the above lot of HAS, it was necessary to add some purified hydroxylammonium sulfate, hereafter referred to as HS, to neutralize a portion of the sulfuric acid in compositions 1–3 below. These compositions were prepared as follows:

| No. | HAS g. | HS g. | Water g. |
|---|---|---|---|
| 1 | 50 | 3.82 | 7.83 |
| 2 | 50 | 1.67 | 5.94 |
| 3 | 50 | 0.84 | 5.2 |

Compositions 4–6 were prepared by adding the required amount of sulfuric acid and water to the HAS to give the proportions set forth below. The crystallization temperatures were as follows (the figures in parenthesis are interpolated values obtained from a plot of crystallization temperature versus sulfuric acid content):

| Composition No. | Sulfuric acid, percent wt. | Water, percent wt. | Crystallization temperature, °C. |
|---|---|---|---|
| 1 | 0.4 | 14.6 | 37.5 |
| 2 | 2.7 | 12.3 | 25.5 |
| 3 | (3.2) | (11.8) | (20.0) |
| 4 | 3.6 | 11.3 | 15.0 |
| 5 | (4.5) | (10.5) | (10.2 min.) |
| 6 | 5.0 | 10.0 | 16.5 |
| 7 | (5.5) | (9.5) | (20) |
| 8 | (6.2) | (8.8) | (25) |
| 9 | 7.4 | 7.6 | 34 |
| 10 | 11.6 | 3.4 | 53 |

The solutions having a sulfuric acid content within the range of from about 2.8% to about 6.2%, and a corresponding water content of from about 12.2% to about 8.8% had crystallization temperatures at or below about 25° C. and were determined to be suitable for shipment in tank cars or tank trucks. Compositions having from about 3.2% to about 5.5% sulfuric acid and a corresponding water content of from about 11.8% to about 9.5% had crystallization temperatures of about 20° C. or less and were determined to be especially useful for cold weather shipment.

EXAMPLE 2

Using the same lot of HAS as used for Example 1, another series of compositions at a concentration of 82.5% by weight HAS were prepared. The crystallization temperatures were as follows:

| Composition No. | Sulfuric acid, percent wt. | Water, percent wt. | Crystallization temperature, °C. |
|---|---|---|---|
| 1 | 2.6 | 14.9 | 34.5 |
| 2 | (4.2) | (13.3) | (25.0) |
| 3 | 4.5 | 13.0 | 23.0 |
| 4 | (5.0) | (12.5) | (20.0) |
| 5 | 6.0 | 11.5 | 13.5 min. |
| 6 | (6.6) | (10.9) | (20) |
| 7 | (7.3) | (10.2) | (25) |
| 8 | 8.0 | 9.5 | 33.5 |

The compositions having a sulfuric acid content within the range of from about 4.2% to about 7.3%, and a corresponding water content of from about 13.3% to about 10.2% had crystallization temperatures at or below about 25° C. and were determined to be suitable for shipment in tank cars or tank trucks. Compositions having from about 5.0% to about 6.6% sulfuric acid and a corresponding water content of from about 12.5% to about 10.9% had crystallization temperatures of about 20° C. or less and were determined to be especially useful for cold weather shipment.

EXAMPLE 3

The experiment of Example 2 was repeated except that the concentration of HAS was 80%. As in Example 1, compositions No. 1 and 2 were prepared by adding 3.8 g. hydroxylammonium sulfate and 11.68 g. of water, and 0.84 g. hydroxylammonium sulfate and 8.70 g. water, respectively, to each of two 50 g. portions of HAS. Compositions 3–6 were prepared by adding sulfuric acid and water to the HAS to give the proportions set forth below. The compositions had the following crystallization temperatures.

| Composition No. | Sulfuric acid, percent wt. | Water, percent wt. | Crystallization temperature, °C. |
|---|---|---|---|
| 1 | 0.4 | 19.6 | 44.5 |
| 2 | 3.4 | 16.6 | 32.5 |
| 3 | (4.5) | (15.5) | (25.0) |
| 4 | (5.5) | (14.5) | (20.0) |
| 5 | 6.0 | 14.0 | 14.5 |
| 6 | 7.0 | 13.0 | 11.0 min. |
| 7 | (7.5) | (12.5) | (20.0) |
| 8 | 8.0 | 12.0 | 24.0 |
| 9 | (8.1) | (11.9) | (25.0) |
| 10 | 10.9 | 9.1 | 27.0 |

The compositions having a sulfuric acid content within the range of from about 4.5% to about 8.1%, and a corresponding water content of from about 15.5% to about 11.9% had crystallization temperatures at or below about 25° C. and were determined to be suitable for shipment in tank cars or tank trucks. Compositions having from about 5.5% to about 7.5% sulfuric acid and a corresponding water content of from about 14.5% to about 12.5% had crystallization temperatures of about 20° C. or less and were determined to be especially useful for cold weather shipment.

EXAMPLE 4

The experiment of Example 2 was repeated except that the concentration of HAS was 75%. As in Example 1, compositions No. 1 and 2 were prepared as follows:

| No. | HAS, g. | HS, g. | Water, g. |
|---|---|---|---|
| 1 | 50 | 3.82 | 16.08 |
| 2 | 50 | 0.84 | 12.67 |

Compositions 3-9 were prepared by adding sulfuric acid and water as required to give the proportions set forth below. The compositions had the following crystallization temperatures.

| Composition No. | Sulfuric acid, percent wt. | Water, percent wt. | Crystallization temperature, °C. |
|---|---|---|---|
| 1 | 0.4 | 24.6 | 46.0 |
| 2 | 3.2 | 21.8 | 39.0 |
| 3 | 6.0 | 19.0 | 27.5 |
| 4 | 6.6 | 18.4 | 25.0 |
| 5 | (7.2) | (17.8) | (20.0) |
| 6 | 8.0 | 17.0 | 16.5 |
| 7 | (9.3) | (15.7) | (9.6 min.) |
| 8 | 10.2 | 14.8 | 12.5 |
| 9 | 12.0 | 13.0 | 20.0 |
| 10 | (12.5) | (12.5) | (25.0) |
| 11 | 13.0 | 12.0 | 31.0 |
| 12 | 14.0 | 11.0 | 35.0 |

The compositions having a sulfuric acid content within the range of from about 6.6% to about 12.5%, and a corresponding water content of from about 18.4% to about 12.5% had crystallization temperatures at or below about 25° C. and were determined to be suitable for shipment in tank cars or tank trucks. Compositions having from about 7.2% to about 12.0% sulfuric acid and a corresponding water content of from about 17.8% to about 13.0% had crystallization temperatures of about 20° C. or less and were determined to be especially useful for cold weather shipment.

EXAMPLE 5

A composition of relatively pure HAS–$H_2SO_4$–$H_2O$ was prepared by suspending 1 mole (164 g.) of neutral hydroxylammonium sulfate in about 25 ml. of water and adding 1 mole of 95% sulfuric acid (103 g.) to produce an approximately 90% w. solution of HAS. The temperature was maintained at 50-60° C. to prevent crystallization.

A series of compositions was then prepared, each having a concentration of 85% by weight HAS and having a free sulfuric acid content of from 2.1% w. to 10.4% w., the remainder being water. The compositions had the following crystallization temperatures.

| Composition No. | Sulfuric acid, percent wt. | Water, percent wt. | Crystallization temperature, °C. |
|---|---|---|---|
| 1 | 2.1 | 12.9 | 25.0 |
| 2 | 2.6 | 12.4 | 21.9 |
| 3 | (2.8) | (12.2) | (20.0) |
| 4 | 3.0 | 12.0 | 18.8 |
| 5 | (3.1) | (11.9) | (18.5 min.) |
| 6 | (3.4) | (11.6) | (20.0) |
| 7 | 3.5 | 11.5 | 20.5 |
| 8 | 3.8 | 11.2 | 22.1 |
| 9 | (4.4) | (10.6) | 25.0 |
| 10 | 4.6 | 10.4 | 25.9 |

The compositions having a sulfuric acid content within a range of from about 2.1% to about 4.4%, and a corresponding water content of from about 12.9% to about 10.6% had a crystallization temperature of about 25° C. or less and were determined to be suitable for shipment in tank cars and tank trucks. Compositions having from about 2.8% to about 3.4% sulfuric acid and a corresponding water content of from about 12.2% to about 11.6% had crystallization temperatures of about 20° C. or less and were determined to be especially useful for cold weather shipment.

EXAMPLE 6

Following the general procedure of Example 5, six compositions were prepared, each having a concentration of 82.5% by weight of relatively pure HAS and having a free sulfuric acid content of from 3% to 6.5%, the remainder being water. The compositions had the following crystallization temperatures.

| Composition No. | Sulfuric acid, percent wt. | Water, percent wt. | Crystallization temperature, °C. |
|---|---|---|---|
| 1 | 3.0 | 14.5 | 25.0 |
| 2 | 3.5 | 14.0 | 21.5 |
| 3 | (3.7) | (13.8) | (20.0) |
| 4 | (4.2) | (13.3) | (16.5 min.) |
| 5 | (5.1) | 12.4 | (20.0) |
| 6 | 5.5 | 12.0 | 20.5 |
| 7 | 6.0 | 11.5 | 24.0 |
| 8 | (6.4) | 11.1 | (25.0) |
| 9 | 6.5 | 11.0 | 26.8 |

The compositions having a sulfuric acid content within the range of from about 3.0% to about 6.4%, and a corresponding water content of from about 14.5% to about 11.1% had crystallization temperatures of about 25° C. or less and were determined to be suitable for shipment in tank cars and tank trucks. Compositions having from about 3.7% to about 5.1% sulfuric acid and a corresponding water content of from about 13.8% to about 12.4% had crystallization temperatures of about 20° C. or less and were determined to be especially useful for cold weather shipment.

EXAMPLE 7

Following the general procedure of Example 5, six compositions were prepared, each having a concentration of 80% by weight relatively pure HAS and a free sulfuric acid content of from 3.5% to 8%, the remainder being water. The crystallization temperature of each composition was as follows:

| Composition No. | Sulfuric acid, percent wt. | Water, percent wt. | Crystallization temperature, °C. |
|---|---|---|---|
| 1 | 3.5 | 16.5 | 26.0 |
| 2 | (3.7) | (16.3) | (25.0) |
| 3 | 4.0 | 16.0 | 22.0 |
| 4 | (4.4) | (15.6) | (20.0) |
| 5 | (5.0) | (15.0) | (15.6 min.) |
| 6 | (6.3) | (13.7) | (20.0) |
| 7 | 7.5 | 12.5 | 23.9 |
| 8 | (7.8) | (12.2) | (25.0) |
| 9 | 8.0 | 12.0 | 25.5 |

The compositions having a sulfuric acid content within the range of from about 3.7% to about 7.8%, and a corresponding water content of from about 16.3% to about 12.2% had crystallization temperatures of about 25° C. or less and were determined to be suitable for shipment in tank cars and tank trucks. Compositions having from about 4.4% to about 6.3% sulfuric acid and a corresponding water content of from about 15.6% to about 13.7% had crystallization temperatures of about 20° C. or less and were determined to be especially useful for cold weather shipment.

EXAMPLE 8

Following the general procedure of Example 5, six solutions were prepared, each having a concentration of 75% by weight pure HAS and a free sulfuric acid of from 4% to 14%, the remainder being water. The crystallization temperature of each composition was as follows:

| Composition No. | Sulfuric acid, percent wt. | Water, percent wt. | Crystallization temperature, °C. |
|---|---|---|---|
| 1 | 4.0 | 21.0 | 33.0 |
| 2 | (5.7) | (19.3) | (25.0) |
| 3 | 6.0 | 19.0 | 23.6 |
| 4 | (6.8) | (18.2) | (20.0) |
| 5 | 8.0 | 17.0 | 14.6 |
| 6 | (9.0) | (16.0) | (10.5 min.) |
| 7 | 10.0 | 15.0 | 14.0 |
| 8 | (10.9) | (14.1) | (20.0) |
| 9 | (11.7) | (13.3) | (25.0) |
| 10 | 12.0 | 13.0 | 26.8 |
| 11 | 14.0 | 11.0 | 35.0 |

The compositions having a sulfuric acid content within the range of from about 5.7% to about 11.7%, and a corresponding water content of from about 19.3% to about 13.3% had crystallization temperatures of about 25° C. or less and were determined to be suitable for shipment in tank cars and tank trucks. Compositions having from about 10.9% to about 6.8% sulfuric acid and a corresponding water content of from about 14.1% to about 18.2% had crystallization temperatures of about 20° C. or less and were determined to be especially useful for cold weather shipment.

Having described this invention, what is claimed is:

1. A liquid low-melting eutectic composition having a crystallization temperature of approximately 25° C. or less consisting essentially of hydroxylammonium acid sulfate (HAS) in an amount of from about 75% to about 85% by weight, sulfuric acid in an amount within the range of from about 2.1 to about 12.5% by weight and water.

2. The composition of claim 1 having a crystallization temperature of approximately 20° C., or less, having from about 75% to about 85% HAS and from within about 2.8% to about 12.0% sulfuric acid and water.

3. The composition of claim 1 having an HAS content of about 75% by weight and a sulfuric acid content within the range of from about 5.7% to about 12.5%.

4. The composition of claim 1 having an HAS content of abotu 85% by weight and a sulfuric acid content within the range of from about 2.1% to about 6.2% by weight.

5. The composition of claim 1 having an HAS content of about 80% by weight and a sulfuric acid content within the range of from about 3.7% to about 8.1% by weight.

6. The composition of claim 1 having an HAS content of baout 82.5% by weight and a sulfuric acid content within the range of from about 3.0% to about 7.3% by weight.

7. The composition of claim 2 having an HAS content of about 75% by weight and a sulfuric acid content within the range of from about 6.8% to about 12.0% by weight.

8. The composition of claim 2 having an HAS content of about 80% by weight and a sulfuric acid content within the range of from about 4.4% to about 7.5% by weight.

9. The composition of claim 2 having an HAS content of about 82.5% by weight and a sulfuric acid content within the range of from about 3.7% to about 6.6% by weight.

10. The composition of claim 2 having an HAS content of about 85.0% by weight and a sulfuric acid content within the range of from about 2.8% to about 5.5% by weight.

References Cited

Condensed Chemical Dictionary, Reinhold, 1961, 6th ed., p. 594.

Chemical Abstracts, American Chemical Society, vol. 5419, p. 17820f.

LEON D. ROSDOL, Primary Examiner

I. GLUCK, Assistant Examiner

U.S. Cl. X.R.

23—117, 190; 252—105